United States Patent
Xu et al.

(10) Patent No.: US 10,277,032 B2
(45) Date of Patent: Apr. 30, 2019

(54) DC VOLTAGE DROOP CONTROL METHOD WITH DEAD-BAND FOR HVDC GRIDS BASED ON DC VOLTAGE FIDUCIAL NODE

(71) Applicant: Zhejiang University, Hangzhou (CN)

(72) Inventors: Zheng Xu, Hangzhou (CN); Liang Xiao, Hangzhou (CN); Gaoren Liu, Hangzhou (CN); Huangqing Xiao, Hangzhou (CN)

(73) Assignee: Zhejiang University, Hangzhou (CN)

( * ) Notice: Subject to any disclaimer, the term of this patent is extended or adjusted under 35 U.S.C. 154(b) by 181 days.

(21) Appl. No.: 15/607,423

(22) Filed: May 26, 2017

(65) Prior Publication Data
US 2017/0346288 A1    Nov. 30, 2017

(30) Foreign Application Priority Data

May 30, 2016    (CN) .......................... 2016 1 0377375

(51) Int. Cl.
*H02J 3/36*        (2006.01)
*H02J 3/38*        (2006.01)

(52) U.S. Cl.
CPC ............... *H02J 3/36* (2013.01); *H02J 3/386* (2013.01); *Y02E 10/763* (2013.01); *Y02E 60/60* (2013.01)

(58) Field of Classification Search
CPC .. H02J 3/36; H02J 3/386; Y02E 60/60; Y02E 10/763
See application file for complete search history.

(56) References Cited

U.S. PATENT DOCUMENTS 8,373,312 B2 *   2/2013   O'Brien ............ H01L 31/02021
                                                        307/140
2011/0309683 A1 *  12/2011  Nielsen ................. F03D 7/0284
                                                        307/84
(Continued)

FOREIGN PATENT DOCUMENTS

CN          103944190 A      7/2014
EP            2797196 A1    10/2014

OTHER PUBLICATIONS

Yan Fayou et al, An Improved Droop Control Strategy for M M C—based VSC-M TDC Systems ,Jan. 25, 2014.
(Continued)

*Primary Examiner* — Jared Fureman
*Assistant Examiner* — Duc M Pham
(74) *Attorney, Agent, or Firm* — Wayne & Ken, LLC; Tony Hom

(57) ABSTRACT

The present invention discloses a fiducial node DC voltage based DC voltage droop control method with dead-band for HVDC grids. Two levels of DC voltage control e.g. primary and secondary DC voltage regulation are introduced to realize load sharing and DC voltage control in HVDC grids. In the process of primary DC voltage regulation, the power flow regulation ability of the entire HVDC grids can be significantly improved, and the DC voltage and stability of the HVDC grids will be quickly controlled and guaranteed for the benefit of droop characteristic. Secondary DC voltage regulation is achieved by by introducing the load-DC voltage controller. In the process of secondary DC voltage regulation, the burden of accommodating power imbalance by the DC voltage fiducial node will be alleviated, thus improving the ability to resist disturbances of the entire HVDC grids.

8 Claims, 7 Drawing Sheets

(56) References Cited

U.S. PATENT DOCUMENTS

| | | | | |
|---|---|---|---|---|
| 2013/0193766 A1* | 8/2013 | Irwin | ............... | H02H 7/268 |
| | | | | 307/82 |
| 2015/0131342 A1* | 5/2015 | Larsson | ............... | H02J 3/36 |
| | | | | 363/35 |
| 2015/0263521 A1* | 9/2015 | Garcia | ............... | F03D 7/048 |
| | | | | 307/52 |
| 2016/0276948 A1* | 9/2016 | Adamczyk | ............... | H02J 1/02 |
| 2017/0117817 A1* | 4/2017 | Ahmed | ............... | H02M 7/7575 |
| 2017/0229857 A1* | 8/2017 | Kral | ............... | H02J 3/382 |

OTHER PUBLICATIONS

Xie Zhuju et al , Hierarchical and Regional Power Flow Control in a DC Grid , Apr. 5, 2016.

Mei Li, et al , Dynamic stability analysis of the interconnected power system with Mengxi UHVDC integration , Nov. 29, 2015.

* cited by examiner

DC VOLTAGE DROOP CONTROL METHOD WITH DEAD-BAND FOR HVDC GRIDS BASED ON DC VOLTAGE FIDUCIAL NODE

FIELD OF THE INVENTION

The present disclosure relates a DC voltage droop control method with dead-band for HVDC grids based on DC voltage fiducial node. The disclosure further relates to a droop controller with dead-band for primary DC voltage regulation in HVDC grids. The disclosure further describes a load-DC voltage controller based on DC voltage fiducial node for secondary DC voltage regulation in HVDC grids.

BACKGROUND OF THE INVENTION

Renewable energies take up more percentages among the power energy structure than ever before with the rapid development of the renewable energies integration technologies. It has been a great challenge that how to ensure a balance between energy supply and demand under this circumstance. Voltage source converter (VSC) based high-voltage direct-current (HVDC) grids are considered as an important way to integrate renewable energies. When integrated through VSC based HVDC grids, those converters at the renewable energies source base are called sending-end converters, whereas those converters connected to the main AC grids are called receiving-end converters. The power supplied by the renewable energies will be transmitted to the main AC grids through the VSC based HVDC grids.

DC voltage serves as an indicator of power balance in the HVDC grids. When the power supplied to the HVDC grids surpasses the demanded, the DC voltage increases, otherwise it decreases. Consequently, DC voltage in HVDC grids has similar characteristics to the frequency in the AC grids, both of which are the measure of power balance in the network. Apparently, it is a primary task to maintain a good control of the DC voltage in HVDC grids.

System level DC voltage control methods of VSC based HVDC grids reported in prior art, mainly include: 1) master-slaver control method; 2) DC voltage margin control method; and 3) DC voltage droop control method.

1) Master-slaver control method. The constant DC voltage controlled station is called master station under normal operating conditions, whereas the other stations equipped with backup DC voltage control are called slaver stations. This control method requires telecommunication between master and slaver stations. When the master station is out of service, a backup DC voltage control signal will be communicated to the slaver station via the protection system, so as to maintain a stable operation of the HVDC grids. The main problem of the master-slaver control method is that the slaver station cannot take over the function of DC voltage control smoothly.

2) DC voltage margin control method. In order to overcome the problem encountered by master-slaver control, DC voltage margin control is proposed to allow other stations to take the role of DC voltage control without telecommunication. The main idea of the DC voltage margin control is to set up a backup constant DC voltage controlled station, whose DC voltage reference is different from that of the current master station. Once the current master station breaks down, the increasing or decreasing DC voltage automatically triggers the margin DC voltage control in the backup station without communication.

3) DC voltage droop control method. Both active power and DC voltage are controlled by the DC voltage droop controller. The mission of regulating the DC voltage is distributed to several stations so as to share the power imbalance simultaneously under disturbances.

However, the main problems of DC voltage margin control method are as follows: firstly, since only one converter station participates in power sharing under disturbances, it takes more time to regain the stable operation compared to DC voltage droop control method; secondly, it is difficult to set up and coordinate the DC voltage reference especially when there are more than one backup constant DC voltage controlled stations in the HVDC grids. The main drawback of DC voltage droop control method is that the power transferred by the droop-controlled station cannot be controlled precisely.

In a word, the drawbacks mentioned above keep these common system level DC voltage control strategies from being implemented further to a certain extent.

SUMMARY OF THE INVENTION

An improved system level DC voltage control method for sharing load and enhancing the operation stability of VSC based HVDC grids is provided by the disclosure via a DC voltage droop control method with dead-band for HVDC grids based on DC voltage fiducial node; via a droop controller with dead-band for primary DC voltage regulation in HVDC grids; via a load-DC voltage controller based on DC voltage fiducial node for secondary DC voltage regulation in HVDC grids; via a VSC based HVDC grid.

A DC voltage droop control method with dead-band for HVDC grids based on DC voltage fiducial node, compromising:

classifying converter nodes in the voltage source converter (VSC) based HVDC grids into power adjustable node and power unadjustable node;

designating the converter node featured with maximum capacity as the DC voltage fiducial node;

controlling the converter at the DC voltage fiducial node through constant DC voltage control mode;

controlling the converters at power unadjustable nodes through constant AC voltage and constant frequency control mode;

controlling the converters at power adjustable node except for the DC voltage fiducial node through DC voltage droop with dead-band control mode.

The detailed implementation of the DC voltage droop control with dead-band control mode further comprising:

determining a local droop power regulation reference $P^*_{droop}$ according to the measured local DC voltage $U_{dc}$ for any power adjustable node except the voltage fiducial node;

determining the local power reference $P^*_{dc}$ according to the power regulation reference $\Delta P^*_{dc}$ generated by the load-DC voltage controller at regular intervals;

generating the d-axis current reference $i_d^*$ using the proportional-integral (PI) controller with input signal $P^*_{droop}+P^*_{dc}-P_{dc}$; wherein $P_{dc}$ is the measured local active power at the power adjustable node;

generating a three-phase AC voltage modulation signal using the newly-obtained d-axis current reference $i^*_d$ and a ready q-axis current reference $i^*_q$.

The droop controller with dead-band for primary DC voltage regulation in HVDC grids functions by determining the local droop power regulation reference $P^*_{droop}$ as follows:

if $U_{dc}>U_{dcmax}$, then $$P^*_{droop} = \frac{U_{dcmax} - U_{dc}}{K};$$

if $U_{dc}<U_{dcmin}$, then $$P^*_{droop} = \frac{U_{dcmin} - U_{dc}}{K};$$

else
if $U_{dcmin}<U_{dc}<U_{dcmax}$, then $P^*_{droop}=0$;
K is the slope of the pre-defined DC voltage droop line, $U_{dcmax}$ and $U_{dcmin}$ are the maximum and minimum voltage of the dead-band respectively. Specifically, the dead-band voltage $U_{dcmax}$ and $U_{dcmin}$ are determined respectively by the maximum and minimum steady-state local DC voltage taking all operation conditions into consideration.

The load-DC voltage controller based on DC voltage fiducial node for secondary DC voltage regulation in HVDC grids functions by updating the local power reference $P^*_{dc}$ as follows:

$$P^*hd\ dc(k+1)=P^*_{dc}(k)+\Delta P^*_{dc}(i\ k+1)$$

wherein $\Delta P^*_{dc}(k+1)$ is the power regulation reference generated by the load-DC voltage controller at k+1 instant, $P^*_{dc}(k+1)$ is the local power reference at k+1 instant, $P^*_{dc}(k)$ is the local power reference at k instant, k is the natural number and $P^*_{dc}(0)$ is determined by the initial power flow when k=0.

The load-DC voltage controller based on DC voltage fiducial node for secondary DC voltage regulation in HVDC grids further comprising,
determining the power deviation reference $\Delta P^*_B$ by $\Delta P^*_B=P^*_{dcB}-P_{dcB}$; wherein $P^*_{dcB}$ and $P_{dcB}$ are the power reference and the actual active power measured at the DC voltage fiducial node respectively;
determining the power deviation reference $\Delta P^*_U$ by $\Delta P^*_U=K_u(U^*_{dcB}-U_{dcB})$; wherein $U^*_{dcB}$ is the pre-defined DC voltage reference, $U_{dcB}$ is the actual DC voltage measured at the DC voltage fiducial node, $K_u$ is the proportional gain;
determining the total power deviation reference $\Delta P^*_{grid}$ by $\Delta P^*_{grid}=\Delta P^*_U-\Delta P^*_B$;
distributing the total power deviation reference $\Delta P^*_{grid}$ as power regulation reference to every power adjustable node accordingly at regular interval;
wherein the distribution criterion further satisfies $\Delta P^*_{grid}=\Delta P^*_{dc1}+\Delta P^*_{dc2}+\ldots+\Delta P^*_{dcn}+\Delta P^*_{dcB}$; where $\Delta P^*_{dc1}\sim\Delta P^*_{dcn}$ is the power regulation reference of power adjustable node 1 to node n except DC voltage fiducial node, $\Delta P^*_{dcB}$ is the power regulation reference of the DC voltage fiducial node, n is the total number of the power adjustable nodes except DC voltage fiducial node.

The local power reference $P^*_{dcB}$ is further determined by the following equation:

$$P^*_{dcB}(k+1)=P^*_{dcB}(k)+\Delta P^*_{dcB}(k+1)$$

wherein $\Delta P^*_{dcB}(k+1)$ is the power regulation reference of the DC voltage fiducial node at k+1 instant; $P^*_{dcB}(k+1)$ is the local power reference of the DC voltage fiducial node at k+1 instant; $P^*_{dcB}(k)$ is the local power reference of the DC voltage fiducial node at k instant; k is the natural number and $P^*_{dcB}(0)$ is determined by the initial power flow when k=0.

The VSC based HVDC grid compromises more than two voltage source converters connected through DC lines; different converters may be controlled through various control mode; the converter featured with maximum capacity is designated as DC voltage fiducial node and is controlled through constant DC voltage control mode; those converters at power adjustable node except for the DC voltage fiducial node are controlled through DC voltage droop with dead-band control mode for primary DC voltage regulation. The local power reference for all power adjustable nodes is updated by the load-DC voltage controller for secondary DC voltage regulation.

Compared to the existing technologies, the technical merits of this invention are summarized as follows:

Firstly, by introducing the DC voltage droop control with dead-band, the power flow regulation ability of the entire HVDC grids can be significantly improved. This is because under small disturbances, the steady state operating status of the HVDC grids will be maintained for the benefit of dead-band control; besides, under large disturbances, the DC voltage and stability of the HVDC grids will be quickly controlled and guaranteed for the benefit of droop characteristic.

Secondly, by introducing the secondary DC voltage regulation, the burden of accommodating power imbalance by the DC voltage fiducial node will be alleviated significantly, thus improving the ability to resist disturbances of the entire HVDC grids.

DETAILED DESCRIPTION OF THE INVENTION

First of all, all the converter nodes in the voltage source converter (VSC) based HVDC grids are classified into two groups, namely, power adjustable node and power unadjustable node. The detailed standards for the converter node classification are: those converter nodes connected to main AC grids are power adjustable nodes, whereas those converter nodes directly connected to loads or solely integrated with renewable energies are power unadjustable nodes. Among the power adjustable nodes, the node whose converter featured with maximum capacity is designated as the DC voltage fiducial node. The DC voltage deviation of the HVDC grids is thus defined as the deviation from this fiducial voltage.

DC voltage in HVDC grids has similar characteristics to the frequency in the AC grids, both of which are the measure of power balance in the network. In AC grids, load sharing and frequency control are realized by primary and secondary frequency regulation. Similarly, two levels of DC voltage control can be introduced to HVDC grids. Here we introduce primary and secondary DC voltage regulation to realize load sharing and DC voltage control in HVDC grids.

For primary DC voltage regulation, the converter at the DC voltage fiducial node is controlled through constant DC voltage control mode; The converters at the power unadjustable node are controlled through constant AC voltage and constant frequency control mode;All the other converters at the power adjustable node except DC voltage fiducial node are controlled through DC voltage droop control method with dead-band control mode.

Primary DC voltage regulation is the inherent response of the DC voltage droop control when HVDC grids subjected to disturbances. Generally, the primary DC voltage regulation functions within a duration of 500 milliseconds after the disturbance disappears. After this 500 milliseconds interval, the secondary (load-DC voltage control) DC voltage regulation takes effect. In this embodiment, the power reference of the power adjustable station is supposed to be refreshed every 500 milliseconds by the secondary DC voltage regulation system, similar to the updation of power reference of automatic generation control (AGC) power plant every certrain seconds realized by secondary frequency regulation in AC grids.

Figure 1:
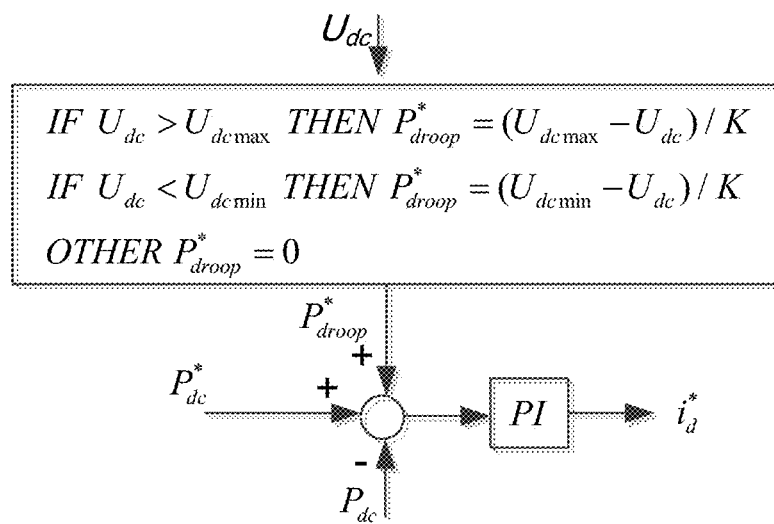
FIG. 1 shows a block diagram of the voltage droop controller with dead-band.
Figure 3:
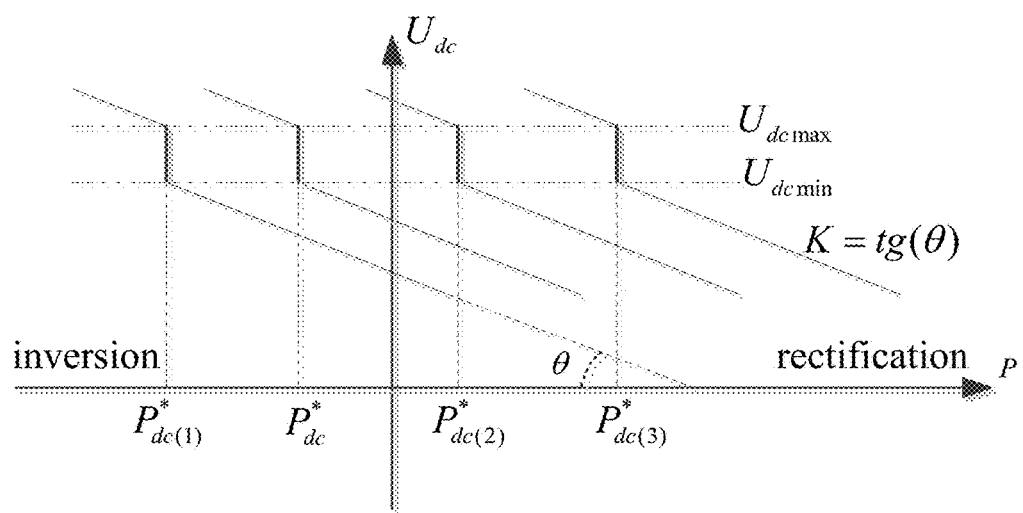
FIG. 3 shows a characteristic curve of the droop controller with dead-band.

FIG. 1 shows the block diagram of the voltage droop controller with dead-band. In the process of the primary DC voltage regulation, the updated local power reference $P^*_{droop}+P^*_{dc}$ is calculated according to the measured local active power $P_{dc}$ and DC voltage $U_{dc}$, where $P^*_{dc}(k+1)=P^*_{dc}(k)+\Delta P^*_{dc}(k+1)$, $\Delta P^*_{dc}(k+1)=0$;

FIG. 3 shows the characteristic curve of the droop controller with dead-band. In FIG. 3, K is the slope of the pre-defined DC voltage droop line; and $U_{dcmax}$ and $U_{dcmin}$ are the maximum and minimum voltage of the dead-band respectively. Specifically, the dead-band voltage $U_{dcmax}$ and $U_{dcmin}$ are determined respectively by the maximum and minimum steady-state local DC voltage taking all operation conditions into consideration. Similar to the constant frequency dead-band and speed droop coefficient parameters of AGC in AC grids, $U_{dcmax}$, $U_{dcmin}$ and K remains constant in the process of primary and secondary DC voltage regulation. $P^*_{dc}$, $P^*_{dc1}$, $P^*_{dc2}$ and $P^*_{dc3}$ are the local power references updated by secondary DC voltage regulation system every 500 milliseconds, where $P^*_{dc}(k+1)=P^*_{dc}(k)+\Delta P^*_{dc}(k+1)$, $\Delta P^*_{dc}(k+1)\neq 0$;

The constant DC voltage controlled fiducial node must be set up first in the normal operation of the HVDC grids. Since the DC voltage fiducial node serves as a slack bus in the HVDC grids, the power through this node varies with loads. In order to alleviate the burden of accommodating power imbalance by the DC voltage fiducial node, as well as to improve the ability of resisting disturbances in the entire HVDC grids, the present disclosure introduces secondary DC voltage regulation, which is also referred to load-DC voltage control.

Figure 2:
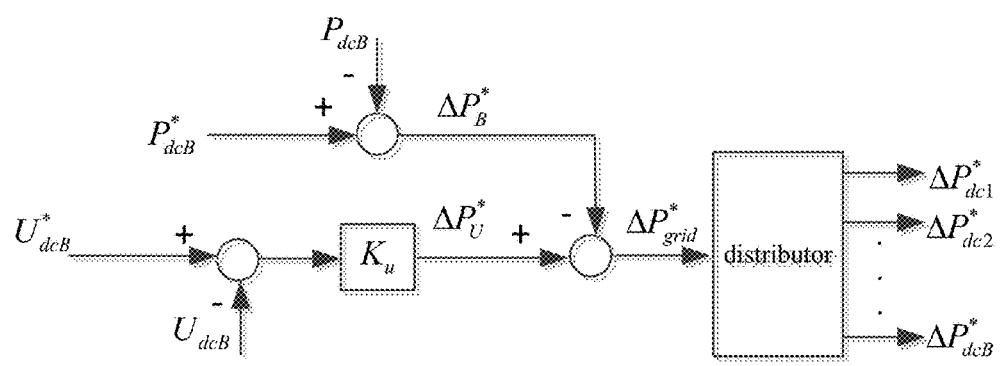
FIG. 2 shows a block diagram of the load-DC voltage controller.

FIG. 2 shows a block diagram of the load-DC voltage controller. The total power deviation reference $\Delta P^*_{grid}$ consists two parts: the first one is the power deviation reference $\Delta P^*_B$ determined by $\Delta P^*_B=P^*_{dcB}-P_{dcB}$, where $P^*_{dcB}$ and $P_{dcB}$ are the power reference and the actual active power measured at the DC voltage fiducial node respectively; Also, $P^*_{dcB}(k+1)=P^*_{dcB}(k)+\Delta P^*_{dcB}(k+1)$. The second part is the power deviation reference $\Delta P^*_U$ determined by $\Delta P^*_U=K_u(U^*_{dcB}-U_{dcB})$, where $U^*_{dcB}$ is the pre-defined fiducial DC voltage reference, $U_{dcB}$ is the actual DC voltage measured at the DC voltage fiducial node, $K_u$ is the proportional gain. The total power deviation reference $\Delta P^*_{grid}$ is determined by $\Delta P^*_{grid}=\Delta P^*_U-\Delta P^*_B$. During the process of secondary DC voltage regulation, $\Delta P^*_{grid}$ is distributed as power regulation reference to every power adjustable station accordingly at regular interval.

Figure 4:
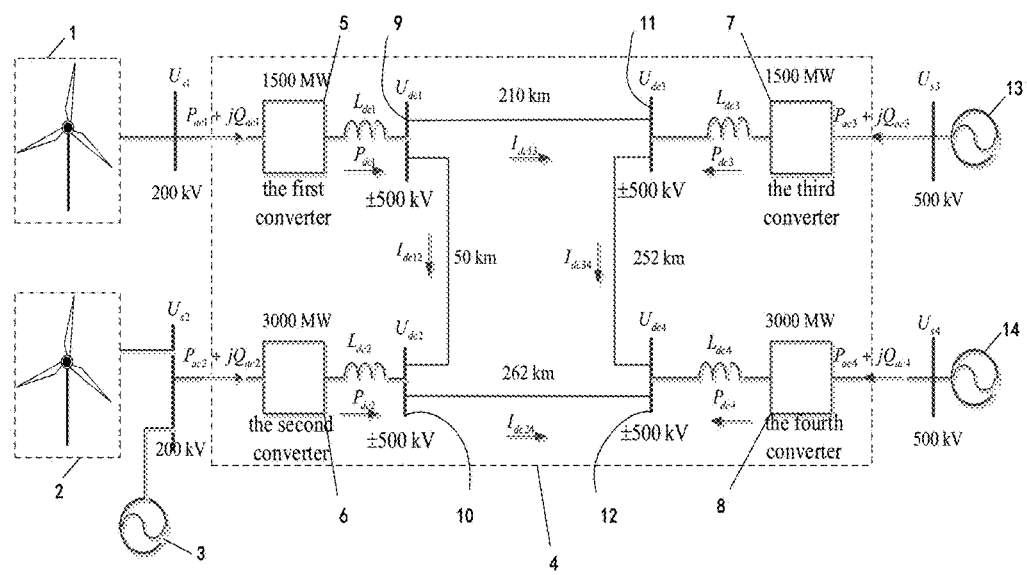
FIG. 4 shows a structure diagram of the four-terminal VSC based HVDC test system.

The implementation of the fiducial node DC voltage based DC voltage droop control method with dead-band will be illustrated further by the four-terminal VSC based HVDC test system (4) shown in FIG. 4. Note that the sign convention applies equally to active and reactive power: positive power means that converter draws power from AC grids.

All the converter nodes (9, 10, 11, 12) in the test HVDC grids (4) should be classified first. Apparently, The first converter (5) is integrated solely with renewable energies (like wind farms) (1), as a result, the first converter node (9) is a power unadjustable node and the first converter (5) adopts constant AC voltage control and frequency control. The second converter (6), the third converter (7) and the fourth converter (8) are connected to AC grids (3, 13, 14), thus the second converter node (10), the third node (11) and the forth node (12) belong to power adjustable node. In this test system (4), the fourth converter (8) is chosen as the DC voltage fiducial station for its largest power capacity and adopts constant DC voltage control with fiducial voltage set to ±500 kV. The second converter (6) and the third converter (7) adopt DC voltage droop control with dead-band (shown in FIG. 1). In the following discussion, the present disclosure focuses on the procedure of determining the proposed droop controller parameters.

For all the converters (5, 6, 7, 8) in the HVDC grids (4), maximum active power $P_{dcmax}$ and minimum active power $P_{dcmin}$ should be determined firstly. For each droop with dead-band controller, parameters that should be determined include the slope of the droop line K, DC voltage dead-band values $U_{dcmax}$ and $U_{dcmin}$.

The maximum and minimum active power $P_{dcmax}$ and $P_{dcmin}$ are determined by the converter capacity. In the test system, since the second converter (6) is the sending-end station, its maximum and minimum active power are set to positive converter capacity and zero respectively. The third converter (7) operates in rectifier or inverter mode, as a result, its maximum and minimum active power are set to positive converter capacity and negative converter capacity respectively. The maximum and minimum active power of the fourth converter (8) are set to zero and negative converter capacity respectively. All maximum and minimum active powers of the droop-controlled converters are listed in TABLE 1.

TABLE 1

| Converter | the first converter | the second converter | the third converter | the fourth converter |
|---|---|---|---|---|
| Maximum power $P_{dcmax}$/MW | 1500 | 3000 | 1500 | 0 |
| Minimum power $P_{dcmin}$/MW | 0 | 0 | −1500 | −3000 |

Droop coefficient K is defined as the change in DC voltage that results in 100% change in converter power flow.

Generally, the value of K varies from 4% to 5% from the practical engineering point of view. In the present test system, K is set to 4% for the second converter (6) and the third converter (7).

The maximum and minimum voltage of the dead-band $U_{dcmax}$ and $U_{dcmin}$ are determined respectively by the maximum and minimum steady-state local DC voltage taking all operation conditions into consideration. Considering the rational operation conditions for the test system, the four extreme operation conditions listed in TABLE 2 are able to cover all the working conditions. Based on the power reference of the extreme operation conditions and the fiducial DC voltage reference, the maximum and minimum voltage of the dead-band $U_{dcmax}$ and $U_{dcmin}$ can be achieved easily by the DC power flow calculation. In this example, the dead-band voltage $U_{dcmax}$ and $U_{dcmin}$ of droop-controlled the second converter (6) and the third converter (7) are calculated as $U_{dc2max}$=506.423 kV, $U_{dc2min}$=501.050 kV, $U_{dc3max}$=504.606 kV, $U_{dc3min}$=501.225 kV.

At this point, the parameters of all the droop controllers have been determined completely.

TABLE 2

| Operation mode | the first converter $P_{dc1}$/MW | the second converter $P_{dc2}$/MW | the third converter $P_{dc3}$/MW | the fourth converter $P_{dc4}$/MW | the second converter $U_{dc2}$/kV | the third converter $U_{dc3}$/kV | fiducial node $U_{dc4}$/kV |
|---|---|---|---|---|---|---|---|
| 1 | 1500 | 3000 | −1500 | −3000 | 506.423 | 501.225 | 500 |
| 2 | 0 | 3000 | 0 | −3000 | 505.57 | 502.089 | 500 |
| 3 | 1500 | 0 | 1500 | −3000 | 502.962 | 504.606 | 500 |
| 4 | 0 | 0 | 1500 | −1500 | 501.05 | 502.734 | 500 |

The following disclosure demonstrates the effectiveness of the proposed control method in improving the stability of the entire HVDC grids when subjected to both small disturbances and large disturbances.

TABLE 3 shows the initial operation status of the test system. The following simulation cases are carried out on the PSCAD/EMTDC platform.

TABLE 3

| Converter | control method | references of the controller |
|---|---|---|
| the first converter | constant AC voltage and frequency control | $U_{s1}^*$ = 220 kV; $f_0^*$ = 50 Hz; wind power: $P_{ac1}$ = 1000 MW; $Q_{ac1}$ = 0 Mvar |
| the second converter | d-axis: DC voltage droop control with dead-band; q-axia: constant reactive power control | $P_{dc2}^*$ = 2000 MW; $Q_{ac2}^*$ = 0 Mvar |
| the third converter | d-axis: DC voltage droop control with dead-band; q-axia: constant reactive power control | $P_{dc3}^*$ = −500 MW; $Q_{ac3}^*$ = 0 Mvar |
| the fourth converter | d-axis: constant DC voltage control; q-axia: constant reactive power control | $U_{dc4}^*$ = ±500 kV; $Q_{ac4}^*$ = 0 Mvar |

(A) Small Disturbances:

In this case, the parameters of load-DC voltage controller (FIG. 2) are shown in TABLE 4. The active power reference will be updated by the secondary DC voltage regulation system (FIG. 2) every 0.5 second.

TABLE 4

| Converter | the first converter | the second converter | the third converter | the fourth converter |
|---|---|---|---|---|
| initial power reference $P_{dc}^*$/MW | 1000 | 2000 | −500 | determined by initial power flow status |
| desired power reference $P_{dc}^*$/MW | 1400 | determined by load-DC voltage controller | determined by load-DC voltage controller | determined by load-DC voltage controller |
| proportional gain $K_u$/MW/kV | — | — | — | 10 |
| coefficient of power distribution | — | 0% | 50% | 50% |

Figure 5A:
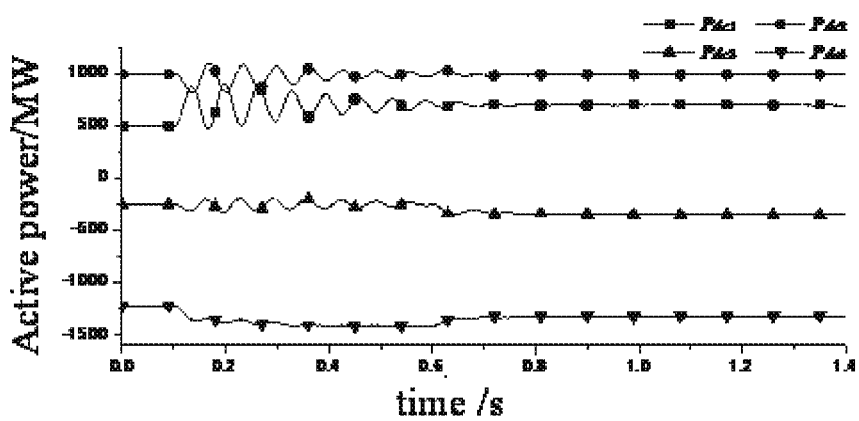
FIG. 5(a) shows a graph of active power of the four converters when the power reference of converter 1 changes.
Figure 5B:
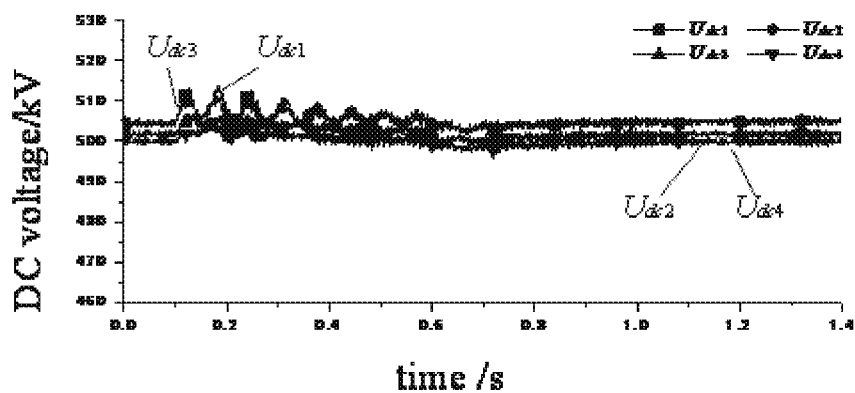
FIG. 5(b) shows a graph of DC voltage of the four converters when the power reference of converter 1 changes.
Figure 5C:
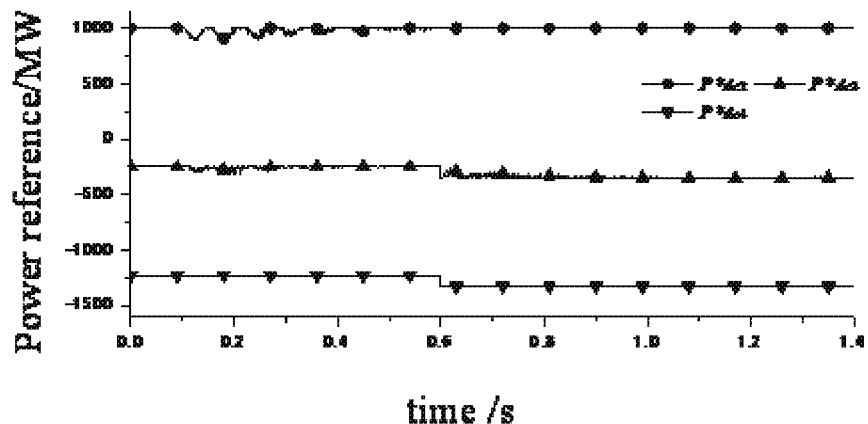
FIG. 5(c) shows a graph of active power reference of converter 2, 3, 4 when the power reference of converter 1 changes.

Suppose the test system has already been in steady state operation at t=0 s, the active power reference $P^*_{dc1}$ of the first converter (5) is changed from 1000 MW to 1400 MW at t=0.1 s. FIG. 5 shows the responses of the test system under this disturbance. Specifically, FIG. 5(*a*) shows a graph of active power of the four converters; FIG. 5(*b*) shows a graph of DC voltage of the four converters; FIG. 5(*c*) shows a graph of active power reference of the second, the third and the fourth converter.

As can be seen from FIG. 5, since the disturbance caused by power change in the first converter (5) is not so large, the power that the fourth converter (8) draws from DC grids (4) does not exceed its maximum capacity, which means the constant DC voltage control mode of the fourth converter (8) does not change. As a result, the DC voltage in the test system will not fluctuate severely. It is notable that as long as the DC voltage does not exceed the dead-band range, the droop-controlled with dead-band converters (6, 7) remains constant power transference.

The response of the entire test system caused by this small disturbance can be depicted as follows: at t=0.1 s, the active power injected to the HVDC grids (4) increases by 400 MW, which leads to a tendency of DC voltage increasing. Once the fiducial constant DC voltage controller at the fourth converter (8) detects the increasing DC voltage, the surplus power will be balanced by the fourth converter (8)at an early stage. Before the secondary DC voltage regulation system functions, the second converter (6) and the third converter (7) remains original constant power transference, the fourth converter (8)remains constant DC voltage control and the power transferred through the fourth converter (8)increases by 400 MW. Since the control period of the secondary DC voltage regulation is 0.5 second, the first update of power reference will occur at t=0.6 s. During the process of secondary DC voltage regulation, the power deviation reference $\Delta P^*_U$, which is the second part of the total power deviation reference to the load-DC voltage controller, remains zero since the DC voltage has been well controlled to the fiducial reference. The total power deviation reference $\Delta P^*_{grid}$ is thus calculated as $\Delta P^*_{grid} = -\Delta P^*_B$, where the power deviation reference $\Delta P^*_B$ is the first part of the total power deviation reference to the load-DC voltage controller and $\Delta P^*_B$ is determined by $\Delta P^*_B = P^*_{dcB} - P_{dcB}$. Then $\Delta P^*_{grid}$ is distributed as power regulation reference to every power adjustable node (converter 2, 3 and 4) at 0.5 second interval, according to the coefficients of power distribution listed in TABLE. 4. This means that after t=0.6 s, the second converter (6), the third converter (7) and the fourth converter (8) operate with a updated power reference. As time goes by with another 0.5 second, the second update of power reference will occur at t=1.1 s with the same procedure depicted at the first period of secondary DC voltage regulation. This procedure will be repeated until the HVDC grids (4) enter to the desired operation status. As seen from FIG. 5, the power transferred by the second converter (6), the third converter (7) and the fourth converter (8) ultimately settle to 2000 MW, −700 MW and −2700 MW respectively, which indicates that the expected operation status has been fulfilled.

(B) Large Disturbances:

In this case, the parameters of load-DC voltage controller (FIG. 2) are shown in TABLE 5. Fiducial DC voltage station shall have enough capacity to accommodate power imbalance. As a result, the second converter (6) is selected as the backup fiducial DC voltage station responsible for fiducial DC voltage control when the master fiducial DC voltage station (8) is out of service. When the master fiducial station (8) breaks down, it takes time for the protection system to inform the backup fiducial DC voltage station (6) to take the role of DC voltage control. In this embodiment, the time delay is set to 50 milliseconds, which means the second converter (6) switches to constant DC voltage control 50 milliseconds after the fourth converter (8) is out of service.

TABLE 5

| Converter | the first converter | the second converter (backup fiducial DC voltage station) | the third converter | the fourth converter (master fiducial DC voltage station) |
|---|---|---|---|---|
| initial power reference $P_{dc}^*$/MW | 1000 | 2000 | −500 | determined by initial power flow status |
| desired power reference $P_{dc}^*$/MW | 1000 | determined by load-DC voltage controller | −1200 | — |
| fiducial DC voltage reference $U_{dc}^*$/kV | — | ±500 kV | — | ±500 kV |
| proportional gain $K_u$/MW/kV | — | 10 | — | 10 |
| coefficient of power distribution | — | 100% | 0% | 0% |

Figure 6A:
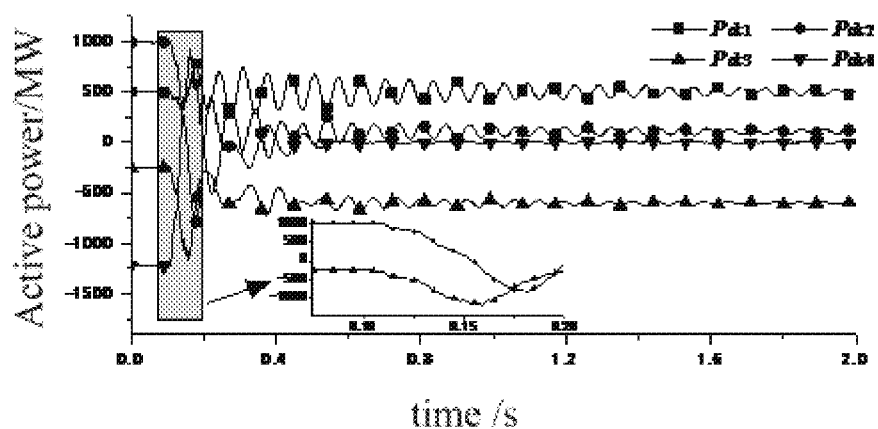
FIG. 6(a) shows a graph of active power of the four converters when converter 4 is out of service.
Figure 6B:
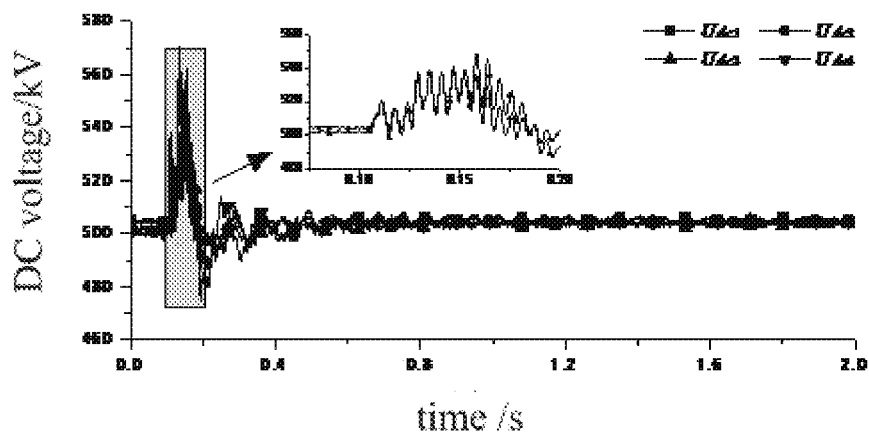
FIG. 6(b) shows a graph of DC voltage of the four converters when converter 4 is out of service.
Figure 6C:
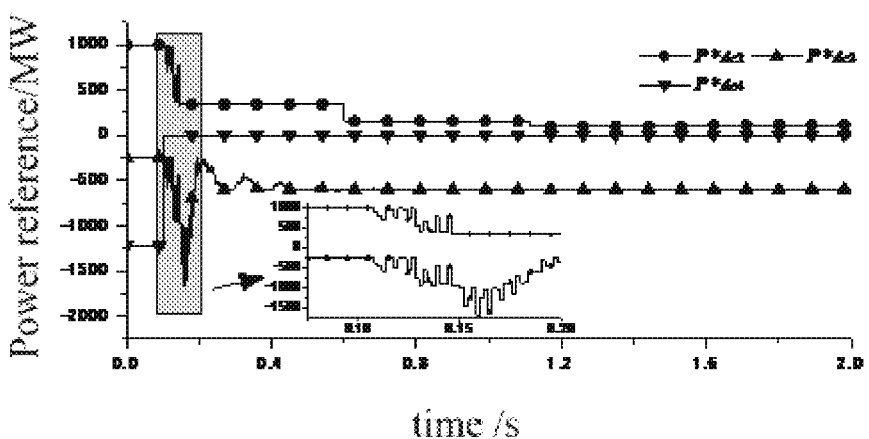
FIG. 6(c) shows a graph of active power reference of converter 2, 3, 4 when when converter 4 is out of service.

Suppose that the test system has already been in steady state operation at t=0 s, the master fiducial DC voltage controlled the fourth converter (8) is out of service at t=0.1 s. FIG. 6 shows the responses of the test system after the fourth converter (8) is out of service. Specifically, FIG. 6(a) shows a graph of active power of the four converters; FIG. 6(b) shows a graph of DC voltage of the four converters; FIG. 6(c) shows a graph of active power reference of converter 2, 3, 4.

The response of the entire test system caused by this large disturbance can be depicted as follows: when master fiducial station (8) breaks down at t=0.1 s, the active power drawn from the HVDC grids (4) decreases by about 2500 MW, which leads to a quick increase of DC voltage. The increasing DC voltage exceeds the dead-band range of the droop controller, as a result, the primary DC voltage regulations of the second converter (6) and the third converter (7) take effect. Consequently, the power of the second converter (6) injected to the HVDC grids (4) decreases and the power of the third converter (7) drawn from the HVDC grids (4) increases. The backup fiducial the second converter (6) switches to constant DC voltage control at t=0.15 s, meanwhile, the desired power reference of the third converter (7) is set to −1200 MW. Since the control period of the secondary DC voltage regulation is 0.5 second, the first update of power reference occurs at t=0.65 s. During the early stage of secondary DC voltage regulation, the power deviation reference $\Delta P^*_U$, which is the second part of the total power deviation reference to the load-DC voltage controller, is determined by $\Delta P^*_U = K_u(U^*_{dcB} - U_{dcB})$. The total power deviation reference $\Delta P^*_{grid}$ is thus calculated as $\Delta P^*_{grid} = \Delta P^*_U - \Delta P^*_B$, where the power deviation reference $\Delta P^*_B$ is the first part of the total power deviation reference to the load-DC voltage controller and $\Delta P^*_B$ is determined by $\Delta P^*_B = P^*_{dcB} - P_{dcB}$. Then $\Delta P^*_{grid}$ is 100 percent assigned to the second converter (6) at 0.5 second interval, according to the coefficients of power distribution listed in TABLE.5. This means that after t=0.65 s, the second converter (6) operates with a updated power reference. As time goes by with another 0.5 secondly, the second update of power reference will occur at t=1.15 s with the same procedure depicted at the first period of secondary DC voltage regulation. This procedure will be repeated until the HVDC grids enter to the desired operation status. As seen from FIG. 6, the power transferred by the second converter (6) and the third converter (7) ultimately settle to 200 MW, and −1200 MW respectively, which indicates that the expected operation status has been fulfilled.

What is claimed is:

1. A DC voltage droop control method with dead-band for HVDC grids based on DC voltage fiducial node, comprising:
    classifying converter nodes in the voltage source converter (VSC) based HVDC grids into power adjustable node and power unadjustable node;
    designating the converter node featured with maximum capacity as the DC voltage fiducial node;
    controlling the converter at the DC voltage fiducial node through constant DC voltage control mode;
    controlling the power unadjustable nodes through constant AC voltage and constant frequency control mode;
    controlling the power adjustable node except for the DC voltage fiducial node through DC voltage droop with dead-band control mode.

2. The method of claim 1, wherein the step of classifying converter nodes in voltage source converter (VSC) based HVDC grids into power adjustable node and power unadjustable node further comprising:
    classifying converter nodes accessing the AC grid as the power adjustable nodes;
    classifying converter nodes directly connected to loads or solely integrated with renewable energies as the power unadjustable node.

3. The method of claim 1, wherein the step of controlling the power adjustable node except for the DC voltage fiducial node through DC voltage droop with dead-band control mode further comprising:

determining a local droop power regulation reference $P^*_{droop}$ according to the measured local DC voltage $U_{dc}$ for any power adjustable node except the voltage fiducial node;

determining the local power reference $P^*_{dc}$ according to the power regulation reference $\Delta P^*_{dc}$ generated by the load-DC voltage controller at regular intervals;

generating the d-axis current reference $i^*_d$ using the proportional-integral (PI) controller with input signal $P^*_{droop} + P^*_{dc} - P_{dc}$; wherein $P_{dc}$ is the measured local active power at the power adjustable node;

generating a three-phase AC voltage modulation signal using the newly-obtained d-axis current reference $i^*_d$ and a ready q-axis current reference $i^*_q$.

4. The method of claim 3, wherein the step of determining the local droop power regulation reference $P^*_{droop}$ further comprising:

if $U_{dc} > U_{dcmax}$, then $$P^*_{droop} = \frac{U_{dcmax} - U_{dc}}{K};$$

if $U_{dc} < U_{dcmin}$, then $$P^*_{droop} = \frac{U_{dcmin} - U_{dc}}{K};$$

else if $U_{dcmin} < U_{dc} < U_{dcmax}$, then $P^*_{droop} = 0$;

wherein K is the slope of a pre-defined DC voltage droop curve; the $U_{dcmax}$ and $U_{dcmin}$ are the maximum and minimum voltage of the dead-band respectively.

5. The method of claim 4, wherein the dead-band voltage $U_{dcmax}$ and $U_{dcmin}$ are determined respectively by the maximum and minimum steady-state local DC voltage taking all operation conditions into consideration.

6. The method of claim 3, wherein the step of determining the local power regulation reference $P^*_{dc}$ further comprising:

obtaining the local power regulation reference $P^*_{dc}$ through the following formula:

$$P^*_{dc}(k+1) = P^*_{dc}(k) + \Delta P^*_{dc}(k+1);$$

wherein $\Delta P^*_{dc}(k+1)$ is the power regulation reference generated by the load-DC voltage controller at k+1 instant, $P^*_{dc}(k+1)$ is the local power reference at k+1 instant, $P^*_{dc}(k)$ is the local power reference at k instant, k is the natural number and $P^*_{dc}(0)$ is determined by the initial power flow when k=0.

7. The method of claim 3, wherein the step of implementing the power regulation reference generated by the load-DC voltage controller at regular intervals further comprising:

determining the power deviation reference $\Delta P^*_B$ by $\Delta P^*_B = P^*_{dcB} - P_{dcB}$; wherein $P^*_{dcB}$ and $P_{dcB}$ are the power reference and the actual active power measured at the DC voltage fiducial node respectively;

determining the power deviation reference $\Delta P^*_U$ by $\Delta P^*_U = K_u(U^*_{dcB} - U_{dcB})$; wherein $U^*_{dcB}$ is the pre-defined DC voltage reference, $U_{dcB}$ is the actual DC voltage measured at the DC voltage fiducial node, $K_u$ is the proportional gain;

determining the total power deviation reference $\Delta P^*_{grid}$ by $\Delta P^*_{grid} = \Delta P^*_U - \Delta P^*_B$;

distributing the total power deviation reference $\Delta P^*_{grid}$ as power regulation reference to every power adjustable node accordingly at regular interval;

wherein the distribution criterion further satisfies $\Delta P^*_{grid} = \Delta P^*_{dc1} + \Delta P^*_{dc2} + \ldots + \Delta P^*_{dcn} + \Delta P^*_{dcB}$; where $\Delta P^*_{dc1} \sim \Delta P^*_{dcn}$ is the power regulation reference of power adjustable node 1 to node n except DC voltage fiducial node, $\Delta P^*_{dcB}$ is the power regulation reference of the DC voltage fiducial node, n is the total number of the power adjustable nodes except DC voltage fiducial node.

8. The method of claim 7, wherein the step of determining the local power reference $P^*_{dcB}$ further comprising:

obtaining the $P^*_{dcB}$ through a formula of:

$$P^*_{dcB}(k+1) = P^*_{dcB}(k) + \Delta P^*_{dcB}(k+1);$$

wherein $\Delta P^*_{dcB}(k+1)$ is the power regulation reference of the DC voltage fiducial node at k+1 instant; $P^*_{dcB}(k+1)$ is the local power reference of the DC voltage fiducial node at k+1 instant; $P^*_{dcB}(k)$ is the local power reference of the DC voltage fiducial node at k instant; k is the natural number and $P^*_{dcB}(0)$ is determined by the initial power flow when k=0.

* * * * *